Jan. 17, 1933.   J. B. LENHART   1,894,406
POTTERY BIRD HOUSE
Filed May 19, 1931
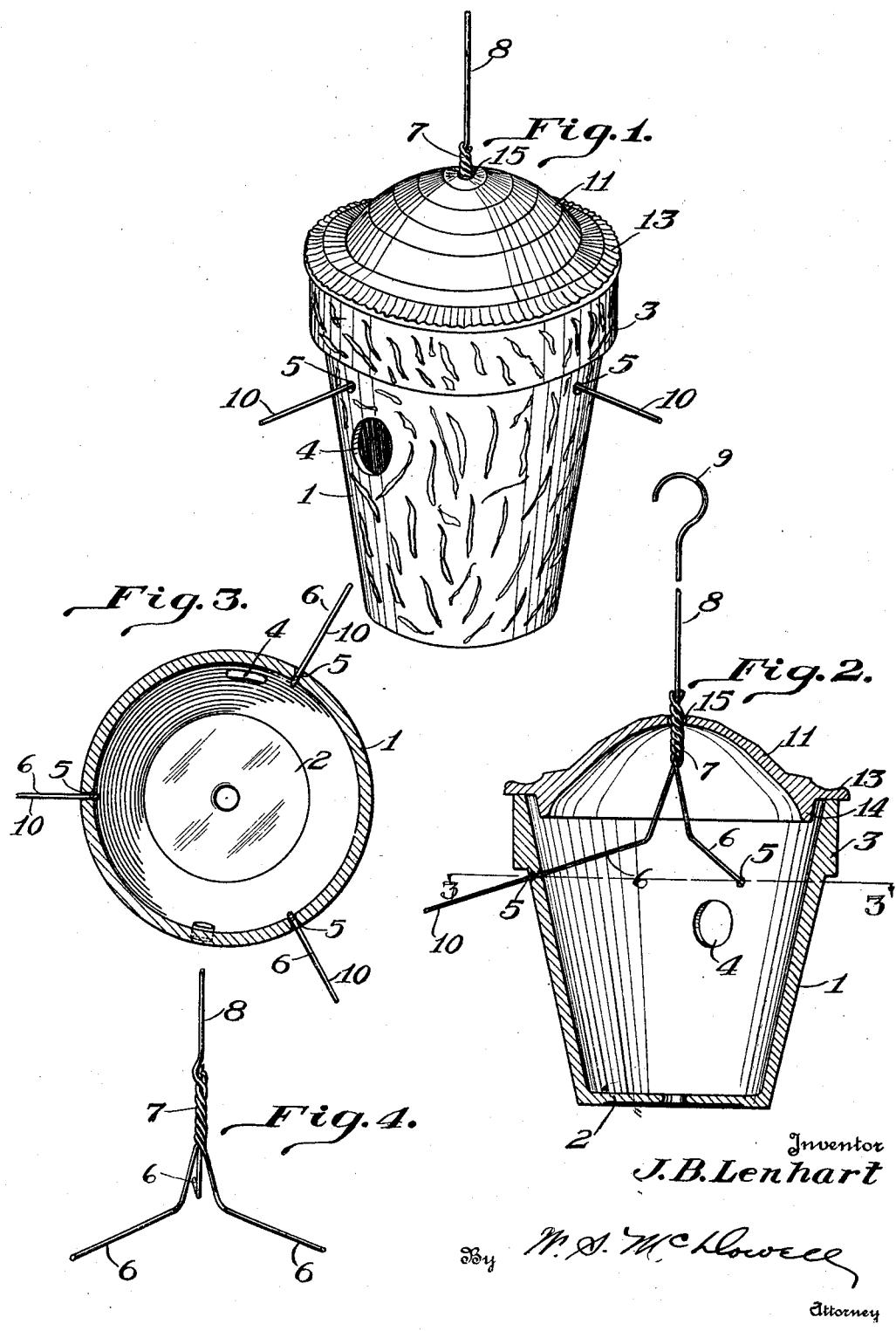

Patented Jan. 17, 1933

1,894,406

UNITED STATES PATENT OFFICE

JOSEPH B. LENHART, OF ROSEVILLE, OHIO

POTTERY BIRD HOUSE

Application filed May 19, 1931. Serial No. 538,535.

This invention relates to an improved pottery bird house which is formed principally from heat treated ceramic materials and an outstanding object of the present invention resides in the provision of a practical and economical structure for this purpose which may be produced at low manufacturing costs.

Ceramic bird houses heretofore employed have been formed to embody an integral pottery structure which have necessitated special equipment in kiln treatment, including the employment of saggers which have resulted in relatively high manufacturing costs and decreased purchasing demand. The present invention, in order to reduce such costs and to permit of ordinary kiln operations, provides an outdoor bird house which comprises a main body section and a separable covering or top section, both of said sections being formed from ceramic materials and of such shape that when placed in a kiln they may be compactly nested or grouped so that a large number of such sections may be treated in the firing zone of the kiln simultaneously and without the use of saggers or other special supports.

It is another object of the invention to provide the completed bird house, when it is assembled for use, with a metallic frame composed of associated wire members which are connected with the base section and extend upwardly and centrally through the cover section in order that the structure may be suspended from an overhead or elevated supporting device, and wherein the frame serves to retain the cover section in secured relationship with the base section to prevent undesired relative movement therebetween, the lower portions of the frame being arranged to protrude through openings in the sides of the base section and to provide lateral extensions which serve as bird perches.

For a further understanding of the invention reference is to be had to the following description and the accompanying drawing, wherein:

Figure 1 is a perspective view of a pottery bird house formed in accordance with the present invention;

Figure 2 is a vertical sectional view taken therethrough;

Figure 3 is a horizontal sectional view on the line 3—3 of Figure 2;

Figure 4 is a perspective view of the metallic supporting frame.

Referring more particularly to the drawing, the numeral 1 designates the main or body section of the bird house. In general, this body section partakes of the form of a baked clay flower pot and involves a generally conical truncated hollow body having smooth round inner walls devoid of projections or shoulders and a flat bottom wall 2 having the usual opening in its center. The outer and upper portion of the body includes an annular shouldered flange 3 integrally formed with and projecting laterally from the lower portions of the body. Any suitable surface ornamentation may be molded in the exterior surfaces of the body. The body is provided intermediately of its height in its side wall with an opening 4 for the ingress and egress of the birds, and suitable nest forming materials may be placed within the body if desired.

While the ware is green or before it is kiln treated, a plurality of small openings 5 are formed in its sides which, after the firing of the ware, are adapted to receive laterally and horizontally extending branches 6 of a wire frame. These branches are secured together by twisting the same as at 7 to unite the branches with an upwardly extending supporting and suspending wire 8, which wire may constitute a continuation of one of the branches. The upper end of the wire is formed with a hook 9 which may be used in effecting the suspension of the structure from a suitable elevated support. The branches 6 of the wire frame are of sufficient length so that they will project a considerable distance beyond the outer sides of the body section 1 to provide exterior bird perches 10.

The open upper portion of the body section 1 is normally closed by a separable cover section 11, also formed from ceramic materials. This cover section is substantially convex in cross-section and terminates in a flat circular flange 13 which rests upon the upper edges of the body flange 3, the flange 13 being formed with a depending annular rib 14 which is received within the body section and engages with the inner walls thereof to retain said cover section in place. Further, the center of the cover section is provided with an opening 15 through which the upwardly extending wire 8 passes, whereby to hold the cover section in secured relation with the body section and to prevent the movement of the birds from accidentally displacing the cover section and breaking the same.

In view of the foregoing it will be seen that the present invention provides a ceramic bird house which lends itself to economical and convenient manufacture and this result is attained primarily by the two part construction produced by a body and cover sections. Also the form of the body section is such that when placed in a kiln it may be nested or grouped with corresponding sections so that a large number thereof may be heat treated simultaneously. The wire frame may then be associated with the body and cover sections to retain the latter securely in place when in use to admit of the suspension of the central structure and securely hold the cover section in connection with the body section, preventing its accidental displacement or breakage when in use. Since the structure is formed mainly from ceramic materials it may be readily maintained in a sanitary condition and nests removed or replaced from time to time. If desired, the back of the body section may be provided with an opening adapted for the reception of a nail or other form of support protruding from the wall, such a lateral support is used in the place of an elevated or overhead support.

While I have described what I consider to be the preferred form of the invention, nevertheless it will be understood that the form of the invention illustrated and described in detail is subject to modification and variation in practice without departing from the scope of the invention as set forth in the following claims.

What is claimed is:

1. A bird house formed from heat treated ceramic materials, comprising a hollow open topped base section having an entrance opening formed in its side wall, the interior of said base section being such as to admit of its being nested with corresponding base sections during heat treatment, a cover section removably positioned upon the upper edge of the base section, and a metallic supporting frame connected with said base section to admit of the suspension of the assembled sections from an elevated support.

2. A bird house formed from heat treated ceramic materials, comprising a hollow inverted truncated conical body section having an open top, the side wall of said body section being provided with an opening, a cover section removably fitted on the upper edge of the body section, and a metallic frame structure formed to include laterally formed extensions positioned in openings formed in the side wall of said body sections and terminating in an upwardly extending portion arranged to pass through an opening formed axially in the cover section.

3. A bird house formed from heat treated ceramic materials, comprising a hollow frusto-conical base section having an open top and a reinforced upper edge portion, the side wall of said body being provided with an opening, a separable cover section having the perimeter thereof positioned upon the upper reinforced edge of said body section, a suspending frame including laterally formed extensions positioned in openings formed in the side wall of said body section, the outer portions of said extensions being projected beyond the side wall of the body section to form perches, said frame having an upwardly directed portion arranged to project through an opening formed axially in said cover section, whereby to position said cover section in secured relationship with the base section.

In testimony whereof I affix my signature.

JOSEPH B. LENHART.